(12) United States Patent
Slaughter et al.

(10) Patent No.: US 8,663,370 B2
(45) Date of Patent: Mar. 4, 2014

(54) BREATHER FOR CRANKCASE VENTILATION SYSTEM

(75) Inventors: Seth E. Slaughter, Peoria, IL (US);
Arthur S. Lindell, Morton, IL (US);
Kathleen Nackers, East Peoria, IL (US);
Ronald P. Maloney, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 147 days.

(21) Appl. No.: 13/113,191

(22) Filed: May 23, 2011

(65) Prior Publication Data

US 2012/0297980 A1  Nov. 29, 2012

(51) Int. Cl.
*B01D 45/00* (2006.01)

(52) U.S. Cl.
USPC .............. 95/272; 55/319; 55/324; 55/309; 55/310; 55/314; 55/416; 55/465; 55/462; 55/502; 55/513; 55/468; 55/385.3; 55/443; 55/446; 55/337; 55/447; 55/490; 55/496; 55/464; 55/DIG. 14; 55/DIG. 19; 123/198 R

(58) Field of Classification Search
USPC .......... 55/319–324, 309, 310–314, 416, 465, 55/462, 502, 513, 468, 385.3, 443–446, 55/337, 447, DIG. 19, DIG. 14, 490, 496, 55/464; 95/272; 123/198 R
See application file for complete search history.

(56) References Cited

U.S. PATENT DOCUMENTS

| | | | |
|---|---|---|---|
| 3,250,263 A * | 5/1966 | Gerjets | 123/573 |
| 5,318,609 A | 6/1994 | Kittler | |
| 6,896,720 B1 * | 5/2005 | Arnold et al. | 95/271 |
| 2010/0224069 A1 * | 9/2010 | Donadei et al. | 96/141 |

FOREIGN PATENT DOCUMENTS

| | | |
|---|---|---|
| JP | 2007100567 | 4/2007 |
| WO | 2007019976 | 4/2007 |

OTHER PUBLICATIONS

English Translation of the Abstract of JP 2007/100567.

* cited by examiner

*Primary Examiner* — Dung H Bui

(57) ABSTRACT

An engine crankcase breather for oil segregation, from blow-by gases, in an engine. The engine crankcase breather includes a housing with an inlet located in a downstream direction of the blow-by gases and an outlet. The breather also includes a baffle within the housing which poses a tortuous path for the blow-by gases, in order to segregate oil particles from the blow-by gases. The baffle includes a hook-shaped portion, in which the oil segregation takes place. The engine crankcase breather further includes a trough extending within the housing. The trough is aligned with the hook-shaped portion of the baffle, to collect the segregated oil from the blow-by gases.

17 Claims, 5 Drawing Sheets

BREATHER FOR CRANKCASE VENTILATION SYSTEM

TECHNICAL FIELD

The present disclosure relates to a crankcase ventilation system, and more particularly to an engine crankcase breather used in the crankcase ventilation system.

BACKGROUND

During an engine operation, some combustion gases, generally referred to as blow-by gases, may leak from an engine cylinder into a crankcase. These gases may mix with oil particles present in the crankcase, which may increase pressure in the crankcase. To relieve the pressure in the crankcase, these gases are typically vented out of the crankcase, e.g., to the atmosphere. Government regulations relating to environmental concerns have mandated engine manufacturers for heavy duty utilities to use engines with a crankcase ventilation system. Such crankcase ventilation system may employ an engine crankcase breather for segregating the oil particles present in the gases, before being released into the atmosphere.

Typically, conventional crankcase ventilation systems use engine crankcase breathers having foil mesh filters for treating blow-by gases prior to the gases being released to the atmosphere. U.S. Pat. No. 5,318,609 (the '609 patent) discloses a plate separator for separating liquids, such as an oil mist, out of a stream of gas with a transverse through flow. The '609 patent discloses a plurality of pairs of curved deflecting surfaces with concave sides facing one another. The curved deflecting surfaces may include an inflow-side and an outflow-side. The inflow-side deflecting surfaces have a curvature increasing in the direction of flow, and the outflow-side deflecting surfaces have a curvature decreasing in the direction of the flow.

SUMMARY

In one aspect, the present disclosure provides an engine crankcase breather. The engine crankcase breather includes a housing, an inlet in the housing and an outlet in the housing. The engine crankcase breather further includes a baffle within the housing. The baffle includes a hook-shaped portion. The breather also includes a trough in the housing. The trough is aligned with the hook-shaped portion of the baffle.

In another aspect, the present disclosure provides an engine. The engine includes an engine cylinder having a cylinder head. The engine further includes a crankcase integral with the engine cylinder. The engine also includes an engine crankcase breather with a housing. The engine crankcase breather includes an inlet in the housing and an outlet in the housing. The inlet is adapted to receive blow-by gases from the crankcase. The outlet is adapted to vent out the blow-by gases from the housing. The engine crankcase breather further includes a baffle within the housing, between the inlet and the outlet. The baffle includes a hook-shaped portion. The breather further includes a trough within the housing. The trough is aligned with the hook-shaped portion of the baffle.

In yet another aspect, the present disclosure provides a method for segregating the oil particles from an exhaust of a crankcase. The method includes inputting crankcase blow-by gases to an inlet of an engine crankcase breather. The blow-by gases are passed through a baffle of the engine crankcase breather. The method includes segregating oil particles from the blow-by gases using a hook-shaped portion of the baffle. The method further includes directing segregated oil particles away from the hook-shaped portion of the baffle to a drain. The segregated oil particles are directed to the drain using a trough formed within a housing of the engine crankcase breather.

Other features and aspects of this disclosure will be apparent from the following description and the accompanying drawings.

DETAILED DESCRIPTION

Figure 1:
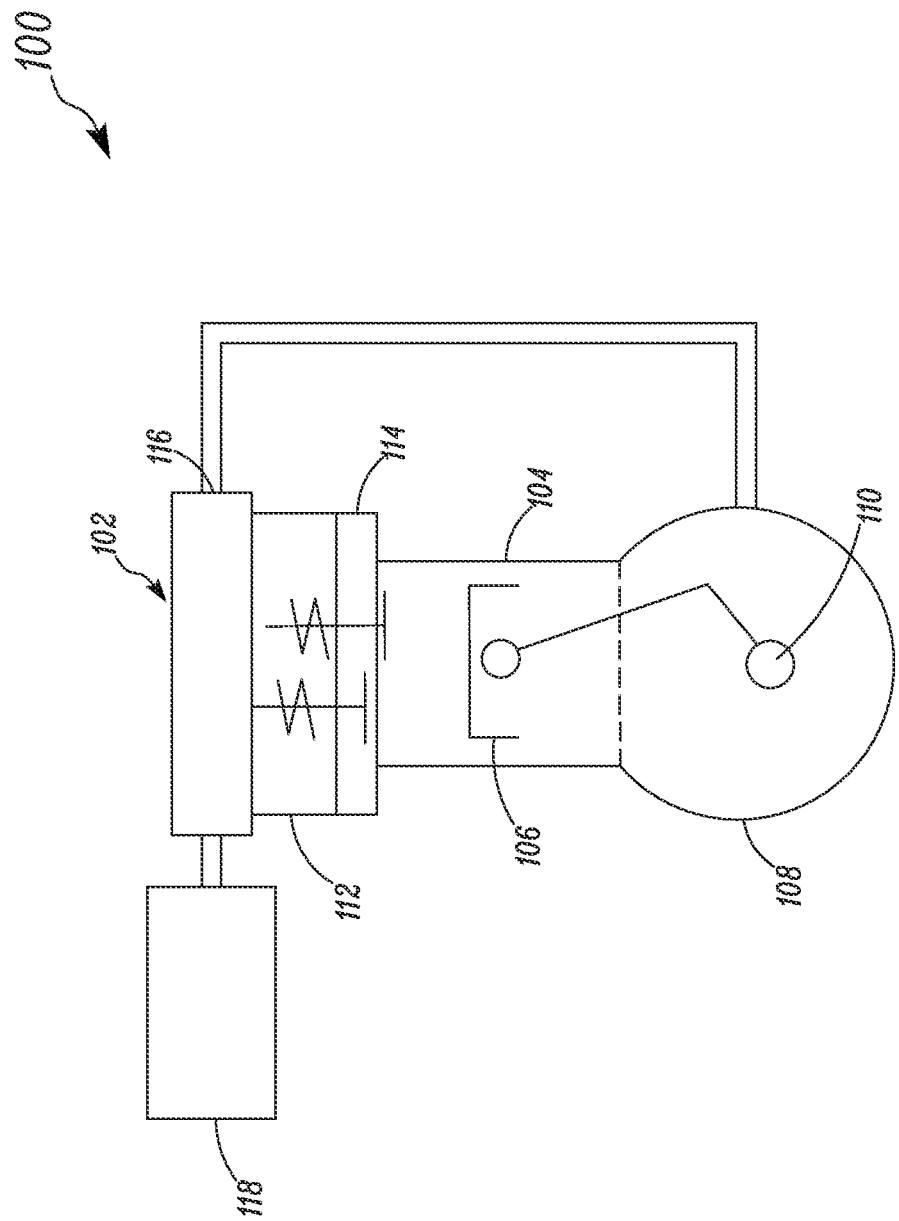
FIG. 1 illustrates a schematic of an engine incorporating an engine crankcase breather in accordance with one aspect of the disclosure.

FIG. 1 illustrates an engine 100 incorporating an engine crankcase breather 102 (herein after referred to as breather 102). The engine 100 may include an engine cylinder 104, which has a piston 106 reciprocating within. The engine 100 may also include a crankcase 108 which may be integral with the engine cylinder 104. The crankcase 108 may further include a crankshaft 110, continuously rotating in the crankcase 108. The engine 100 may further include an engine cylinder head 112, which is disposed above the engine cylinder 104. The engine cylinder head 112 may include an intake manifold 114 connected to the engine cylinder 104 at one end. For the purpose of the present disclosure, the engine 100 may embody an internal combustion engine; a petrol engine, a diesel engine or the like. However, it may be contemplated that the breather 102 may be utilized in conjunction with any other type of engine.

FIG. 1 further illustrates a connection between the crankcase 108 and an inlet 116 of the breather 102. The inlet 116 of the breather 102 is configured to receive some gases that may leak through the engine cylinder 104 to the crankcase 108. These gases, generally referred to as blow-by gases, may mix with oil present in the crankcase 108.

In a configuration as illustrated in FIG. 1, the breather 102 may be connected to the crankcase 108 at one of its ends with some connection means in between. The breather 102 may be generally rectangular in shape with side walls extending vertically from top and bottom plates. The breather 102 may be placed over the engine cylinder head 112, close to the intake manifold 114. A relatively narrow and longer shape may be desirable for packaging purposes in embodiments wherein the breather 102 is disposed at a side of the engine 100. So, in an alternate configuration, the breather 102 could be placed sideways along the crankcase 108, which may result in a more conducive packaging.

The engine 100 may further include an exhaust unit 118 to vent out the blow-by gases, after segregation of oil particles. In an embodiment, the blow-by gases after segregation of the oil particles may be exhausted directly to the atmosphere. In an alternative embodiment, some fraction of the blow-by gases, after segregation of the oil particles, may be exhausted to the atmosphere and the remaining fraction may be passed back to the engine cylinder 104 via the intake manifold 114. The exhaust unit 118 may further include an additional filter (not illustrated) for segregation of any oil particles remaining in the blow-by gases received from the breather 102.

Figure 2:
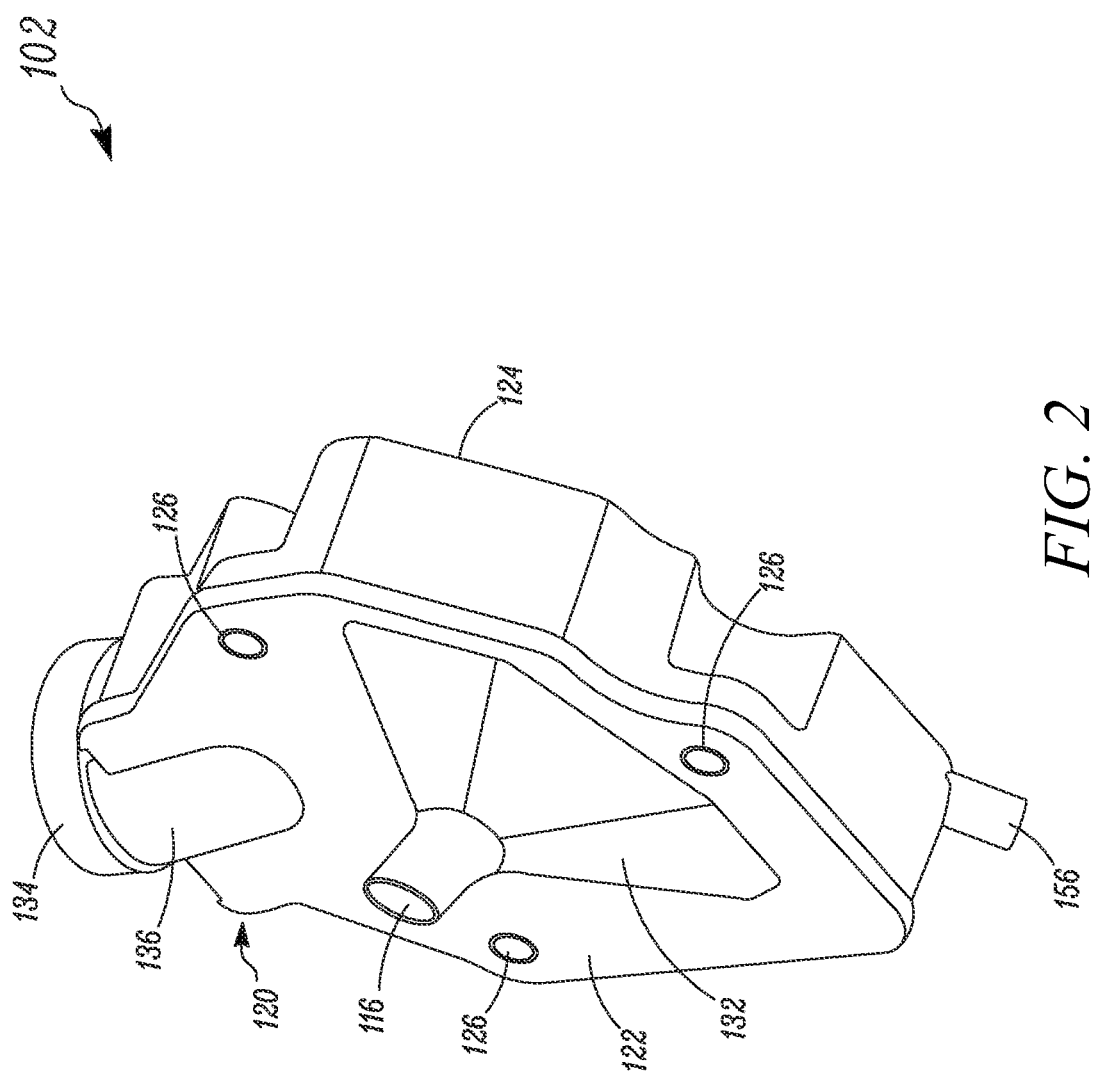
FIG. 2 illustrates an assembled perspective view of the engine crankcase breather.
Figure 3:
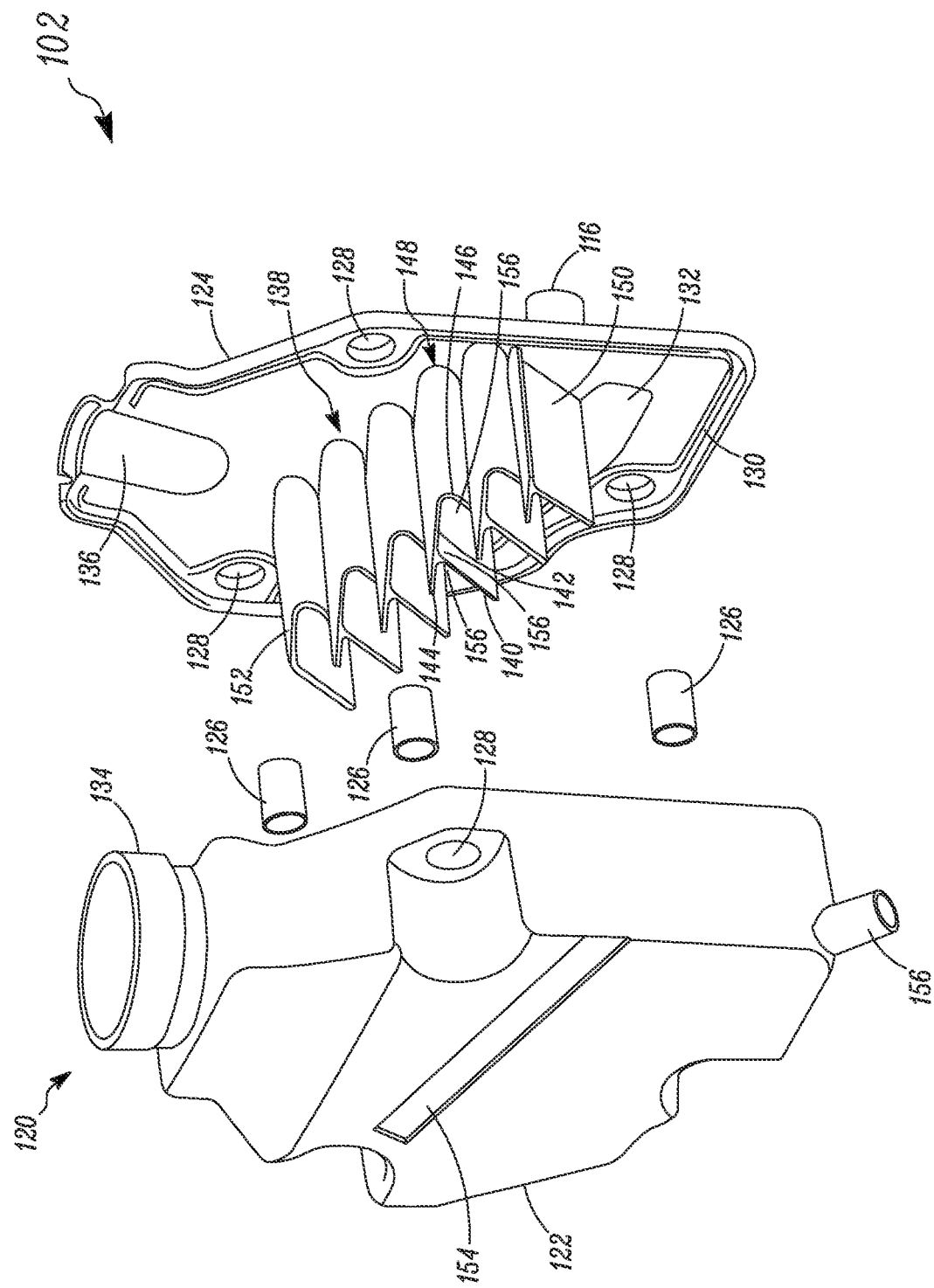
FIG. 3 illustrates an exploded perspective view of the engine crankcase breather.

FIG. 2-3 illustrates the breather 102 that may be utilized with a crankcase ventilation system for the engine 100. FIG. 2 illustrates an assembled perspective view of the breather 102, where the breather 102 is assembled in a substantially rectangular configuration. The rectangular construction for the breather 100 may help in easy molding of the housing 102 and may have significant cost advantages. FIG. 3 illustrates an exploded perspective view of the breather 102. The breather 102 may include a housing 120 as illustrated in FIG. 1 and FIG. 2. The housing 120 may further include a first cover 122, and a second cover 124 which is coupled with the first cover 122.

In an embodiment of the disclosure, the breather 102 may include fastening arrangement 126 for coupling the first cover 122 with the second cover 124. The fastening arrangement 126 may use a plurality of rivets, a snap fit arrangement, a nut and bolt arrangement, or the like. Further, each of the first cover 122 and the second cover 124 may include a plurality of holes 128, conforming to each other. The holes 128 may be adapted to receive the fastening arrangement 126 therethrough, to facilitate the coupling of the first cover 122 with the second cover 124. The first cover 122 or the second cover 124 may also include a groove 130 formed therein. The groove 130 may run along periphery of the first cover 122 or the second cover 124 that may conform to the shape of peripheral sides in other adjacent cover, the second cover 124 or the first cover 122 respectively.

In an embodiment of the disclosure, the housing 120 may be formed by manufacturing process such as, but not limited to, molding process. The molding of the housing 120 may involve preparing cast of the first cover 122 and the second cover 124. The first cover 122 and the second cover 124 may also be prepared by die-casting. The first cover 122 and the second cover 124 may then be fastened together to form the housing 120.

As illustrated in FIG. 2, the breather 100 includes the inlet 116 in the housing 120. The inlet 116 may be integrally molded to the second cover 124, and may protrude from the second cover 124. Alternatively, the inlet 116 may be integrally molded with the first cover 122 and may protrude from the first cover 122. The inlet 116 may also include a broadening inlet channel 132, which connects to the housing 120. Specifically, the inlet 116 may extend in the second cover 124 as the inlet channel 132.

The breather 102 may further include an outlet 134 in the housing 120. The outlet 134 may be integrally molded to the first cover 122. In an alternative embodiment, the outlet 134 may be integrally molded with the second cover 124. Otherwise, the outlet 134 may be partially protruding from the first cover 122 as well as the second cover 124; particularly the outlet 134 may be partially and integrally molded with the first cover 122 and the second cover 124.

In another embodiment of the breather 102, the housing 120 may include a cavity 136, adapted to conform to the shape of the outlet 134, as illustrated in FIG. 3. Specifically, the outlet 134 may protrude slightly beyond a plane defined by peripheral sides of the first cover 122. The cavity 136 may conform to extended portion of the outlet 134 for allowing proper fit between the first cover 122 and the second cover 124.

As illustrated in the FIG. 3, the breather 102 may include one or more baffles 138. In one embodiment, the baffles 138 may extend perpendicularly from the second cover 124. Alternatively, the baffles 138 may extend from the second cover 124 in an angular manner. Correspondingly, the first cover 122 may be configured with a depression (not illustrated) for receiving the baffles 138 therein. In an alternative embodiment, the baffles 138 may be disposed and extend from the first cover 122. In such a case, the second cover 124 may be configured with the depression for receiving the baffles 138 therein.

In an embodiment of the present disclosure, the baffles 138 may be integrally molded with the second cover 124 or the first cover 122. Alternatively, the baffles 138 may be formed separately and then joined with the first cover 122 or the second cover 124 by any suitable means known in the art.

In an embodiment, the baffles 138 may be arranged parallel to each other. However it may be contemplated, that the baffles 138 may be arranged with respect to each other in some other arrangement as well. The baffles 138 may be positioned in the housing 120 in close proximity to the inlet channel 132. Further, the baffles 138 are arranged in a manner to make the blow-by gases encounter a tortuous or a labyrinth path as the blow-by gases enter the housing 120 from the inlet 116. The baffles 138 may be generally planar, disposed with respect to each other in the direction perpendicular to the direction of the flow of the blow-by gases from the inlet 116.

In an embodiment of the present disclosure, the baffles 138 may include a first leg 140, a second leg 142, a third leg 144 and a curl 146. For the purpose of the present disclosure, the first leg 140 of the baffles 138 may be a planar structure. The first leg 140 of the baffles 138 may be positioned in close proximity to the inlet channel 132. The second leg 142 and the third leg 144 together may form another planar structure, and may be disposed on the first leg 140 of the baffles 138 in an angular manner. The third leg 144 may be connected to the second leg 142 at an intersection of the first leg 140 and the second leg 142, such that the third leg 144 may be extending substantially parallel to the second leg 142.

As illustrated in the FIG. 3, the first leg 140, second leg 142, and the third leg 144 may be positioned with respect to each other to form a substantially T-shaped structure. The T-shaped structure of the baffles 138 is orientated such that the first leg 140 of the baffles 138 may form a stem of the T-shaped baffles 138 and the second leg 142 and the third leg 144 together form a head of the T-shaped baffles 138. Further, the curl 146 may extend from an edge of the second leg 142, up at its end, to bend in a direction towards the first leg 140. In an embodiment, the curl 146 may extend through an angle of about 180 degrees and may have a constant radius of curvature. The third leg 144, the second leg 142, and the curl 146 together form a hook-shaped portion 148 disposed on top of the first leg 140. Thus, the hook-shaped portion 148, defined by the third leg 144, the second leg 142 and the curl 146, may constitute an angularly defined head of the T-shaped baffles 138.

In an embodiment of the present disclosure, one or more baffles 150, 152 may have a different structural configuration from that of baffles 138. For example, the baffle 150 may not include the curl 146 extending from the second leg 142. Further, the other baffle 152 may not include the third leg 144 extending beyond the second leg 142 thereof. It may be evident to those skilled in the art, that the different configuration of baffles 150, 152 may be required to accommodate the baffles 138, 150, 152 within the housing 120 of the breather 102.

The breather 102 may further include a trough 154 extending in the housing 120 of the breather 102. In an embodiment wherein the baffles 138 are disposed extending from the second cover 124 of the housing 120, then the trough 154 may be disposed within the first cover 122 of the housing 120. In an alternative embodiment wherein the baffles 138 are disposed extending from the first cover 122, then the trough 154 may be disposed within the second cover 124. In the embodiment illustrated in the FIG. 3, the trough 154 may be formed as a slot in the first cover 122. The trough 154 may be aligned with the baffles 138 in the second cover 124. Specifically, the trough 154 may be aligned with the hook-shaped portion 148 of the baffles 138. Although not illustrated, in one embodiment the trough 154 may extend down to a drain 156 protruding from the housing 120 of the breather 102. Alternatively, the drain 156 may be provided in a downward direction from the trough 154 such that droplets from the trough 154 move naturally toward the drain 156 as a result of gravity.

Figure 4:
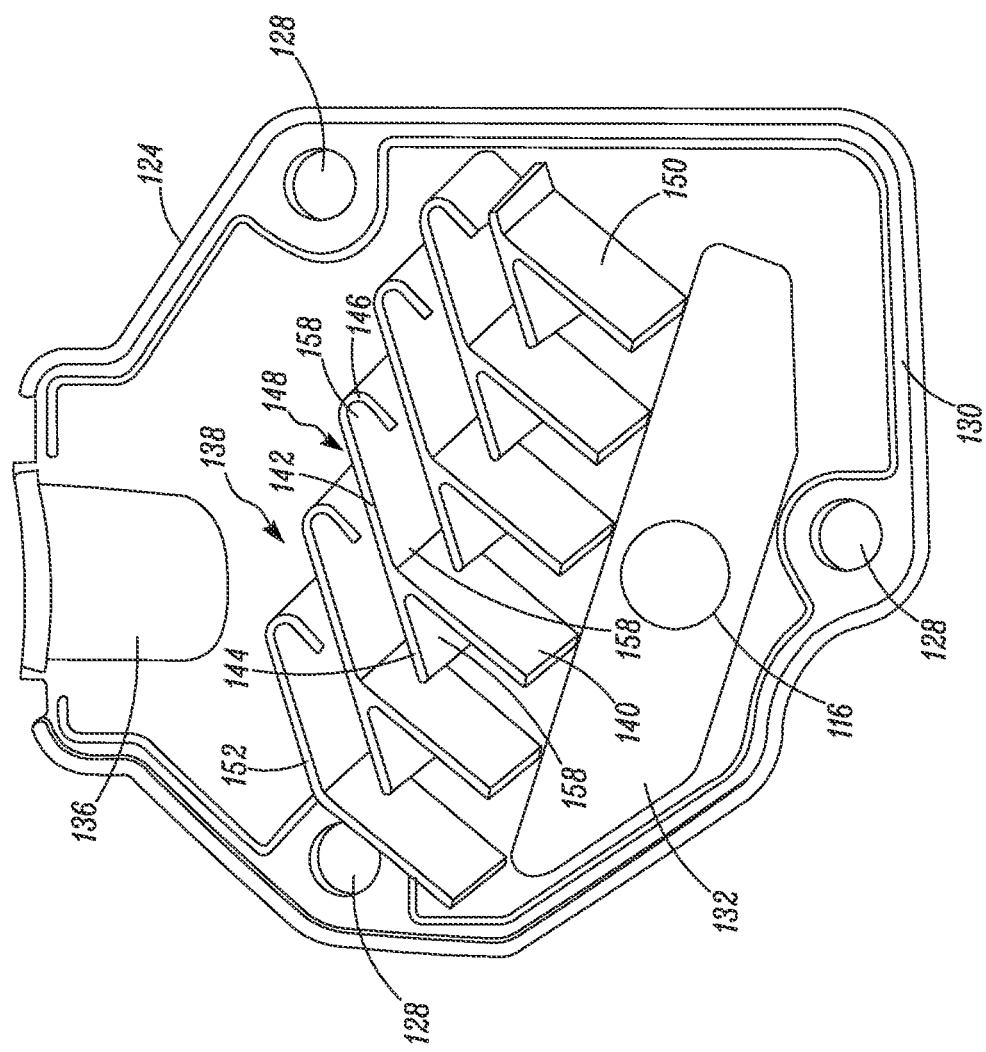
FIG. 4 illustrates a plan view of a second cover of the engine crankcase breather.

FIG. 4 illustrates the inlet channel 132 in the second cover 124 of the housing 120. The inlet channel 132 may be present in the second cover 124 in close proximity to the first leg 140 of the baffles 138. Specifically, the inlet channel 132 may be present at the bottom of the first leg 140 of the baffles 138. In an alternative embodiment, when the baffles 138 may be mounted on the first cover 140, the inlet channel 132 may be disposed from the first cover 140. The inlet channel 132 may be configured to extend in the second cover 124 to allow substantially proper distribution of the blow-by gases across the baffles 138.

FIG. 4 also illustrates pockets 158 between the baffles 138. The pockets 158 may constitute the spaces where oil segregation, from the blow-by gases, takes place. The pockets 158 are defined in the breather 102 at the regions where the blow-by gases encounter turns as the blow-by gases transverse along the baffles 138. The breather 102 may include one pocket 158 at the junction of the first leg 140 and the second leg 142, at the side where the second leg 142 may be disposed on the first leg 140. Another pocket 158 may be defined in the space, where the curl 146 extends from the second leg 142 at its end. Another possible pocket 158 may form in the space between the first leg 140 and the third leg 144, where the third leg 144 may be disposed from the first leg 140.

INDUSTRIAL APPLICABILITY

Referring to the figures in general, in operation, the breather 102 may be used for segregation of the oil particles from exhaust of the crankcase 108, commonly referred to as "blow-by gases". Specifically, the breather 102 may facilitate in segregating the oil particles from the blow-by gases. The gases in the engine cylinder 104 may leak from the piston 106 into the crankcase 108. The crankshaft 110 continuously rotates in the crankcase 108, which results in splashing of the oil in the crankcase 108. The continuous splashing of the oil in the crankcase 108 may result in mixing of the oil particles in the blow-by gases. The blow-by gases may carry the oil particles from the crankcase 108, as the blow-by gases leave the crankcase 108. The blow-by gases are generally a mix of gaseous hydrocarbon particulates (leaked from the engine cylinder 104), the particles (carried by the crankcase 108), gases like COx, NOx (generated in the engine cylinder 104) and soot particles, etc.

Figure 5:
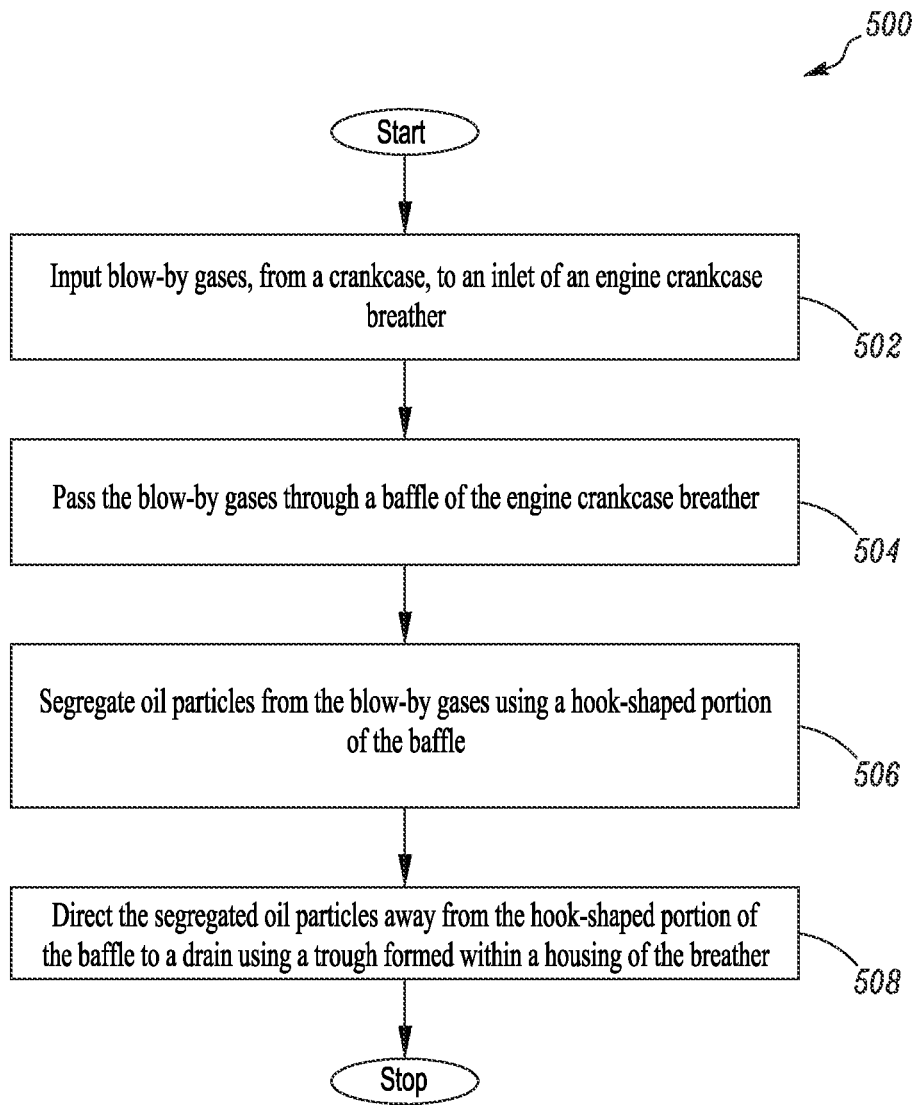
FIG. 5 illustrates a flow chart for a method of segregating oil particles from blow-by gases.

As illustrated in the process flow 500 of FIG. 5, in step 502, the blow-by gases from the crankcase 108 may be input to the inlet 116 of the breather 102. The blow-by gases may pass through the inlet 116 to the inlet channel 132 in the housing 120 of the breather 102. The inlet channel 132 may be configured to direct the flow of the blow-by gases to the baffles 138 for segregation of the oil particles from the blow-by gases. The inlet channel 132 aids in directing the flow of the blow-by gases through out the baffles 138. This may allow for efficient oil segregation, as the flow of the blow-by gases may be evenly distributed across the baffles 138.

In an embodiment, the amount of oil carried along with the flow of the blow-by gases, may depend on a pressure of the blow-by gases received from the crankcase 108. Thus, the amount of oil that may be carried in the housing 120, along with the flow of the blow-by gases, may be a direct function of the pressure of the blow-by gases received from the crankcase 108. Similarly, the amount of oil carried in the housing 120, may also be dependent on the speed of the blow-by gases. In an embodiment, the oil particles may be carried along with the flow of the blow-by gases, due to the inertia of the blow-gases.

The blow-by gases, containing the oil particles may encounter the baffles 138 in the breather 102, before venting out the blow-by gases from the breather 102. As illustrated in FIG. 3, the baffles 138 may extend from the second cover 124 within the peripheral limits of the housing 120, in a manner that provides a tortuous or labyrinth path to the blow-by gases. The baffles 138 may be arranged to minimize the pressure losses in the blow-by gases, as the blow-by gases transverse through the baffles 138. In an embodiment of the present disclosure, the baffles 138 may be mounted on the second cover 124 and arranged with respect to each other in a parallel configuration.

Specifically, in step 504, the blow-by gases may be passed from the inlet channel 132 to the baffles 138 of the breather 102 to segregate the oil particles from the blow-by gases in step 506. Specifically, the blow-by gases are passed to the first leg 140 of the baffles 138. The first leg 140 of the baffles 138 may be configured to have a planar structure. The planar structure of the first leg 140 may make the flow of the blow-by gases more uniform as they flow thereby. As the blow-by gases transverse along the surface of the first leg 140 of the baffles 138, the speed of the blow-by gases may be reduced. The reduction in speed of the blow-by gases may result in segregation of a fraction of the oil particles from the blow-by gases.

Subsequently, the blow-by gases are directed to the hook-shaped portion 148 of the baffles 138. The design of the baffles 138 is configured in a manner that the blow-by gases may automatically be directed from the first leg 140 towards the hook-shaped portion 148 of the baffles 138. The hook-shaped portion 148 of the baffles 138 may be configured to provide sharp turns to the blow-by gases, as the blow-by gases transverse through the baffles 138. Such sharp turns may create turbulence zones in the pockets 158 of the baffles 138, which may lead to a pressure drop in the blow-by gases. The pressure drop in the blow-by gases may lead to the segregation of the oil particles from the blow-by gases. The sharp turns may also reduce the speed and the inertia of the flow of the blow-by gases, which may also reduce the entrainment of the oil particles in the blow-by gases.

Specifically, the hook-shaped portion 148 may constitute the second leg 142, the third leg 144 and the curl 146 of the baffles 138. When the blow-by gases moves from the first leg 140 to the second leg 142 of the hook-shaped portion of the baffles 138, the blow-by gases may encounter a turn at the junction of the first leg 140 and the second leg 142. The turn may reduce down the speed of the blow-by gases, which may lead to the segregation of a fraction of the oil particles from the blow-by gases in the pocket 158.

Subsequently, the blow-by gases may transverse the path confining the surface of the second leg 142. The second leg 142 of the baffles 138 may also be configured to have a planar structure. The second leg 142 of the baffles 138 may direct the blow-by gases to the curl 146 at the end of the second leg 142.

The curl 146 may be configured to provide a sharp turn to the flow of the blow-by gases. The sharp turn posed by the curl 146 may further reduce the speed of the blow-by gases which may result in segregating of another fraction of the oil particles from the blow-by gases.

Further, in one embodiment, blow-by gases may also be directed from the first leg 140 of the baffles 138 to the third leg 144 of the hook-shaped portion of the baffles 138. As the blow-by gases move from the first leg 140 to the third leg 144, the blow-by gases may encounter a turn at the junction of the first leg 140 and the third leg 144, which may lead to the segregation of yet another fraction of the oil particles from the blow-by gases.

Once the oil is segregated by the hook-shaped portion 148 of one of the baffles 138, in step 508, the segregated oil may be directed away from the hook-shaped portion 148 towards the drain 156 using the trough 154 formed within the housing 120 of the breather 102. In an embodiment, the trough 154 may be aligned with the hook-shaped portion 148 of the baffles 138. Specifically, the hook-shaped portion 148 of an adjacent baffle (of the baffles 138) may facilitate in directing segregated oil towards the trough 154. The third leg 144 of the hook-shaped portion 148 of the baffles 138 may direct the segregated oil to fall in the trough 154.

In one embodiment, wherein the trough 154 is formed in the shape of the slot in the first cover 122, the segregated oil from the trough 154 may move naturally in the downward direction toward the drain 156 as a result of gravity. In an alternative embodiment, wherein the trough 154 is formed in the housing 120 down to the drain 156, the segregated oil may flow directly from the trough 154 down to the drain 156, following the passage formed by the trough 154 in the housing 120.

Generally, the segregated oil particles may be entrained in the blow-by gases depending on a pressure of the flow of the blow-by gases. However, the trough 154 may be disposed within the housing 120 such that the segregated oil particles may be directed towards the drain 156 and may not re-entrained back into the blow-by gases.

The blow-by gases (substantially segregated of the oil particles) may be directed towards the outlet 134, guided by the baffles 138. In an embodiment of the present disclosure, the segregated oil, from the drain 156, may flow back to the crankcase 108. In an alternative embodiment, the segregated oil from the drain 156 may be received by an oil sump (not illustrated) in the engine 100, from where the segregated oil may be supplied back to the crankcase 108 when required by the engine 100.

Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. An engine crankcase breather comprising:
   a housing;
   an inlet in the housing;
   an outlet in the housing;
   a baffle disposed within the housing, wherein the baffle includes a hook-shaped portion; and
   a trough disposed within the housing, wherein the trough is aligned with the hook-shaped portion of the baffle,
   wherein the baffle includes:
   a first leg having a planar structure,
   a second leg having a planar structure,
   a third leg having a planar structure, and
   a curl extending from an edge of the second leg towards the first leg.

2. The engine crankcase breather of claim 1 further includes a drain protruding from the housing and wherein the drain is in fluid communication with the trough.

3. The engine crankcase breather of claim 1, wherein the trough includes a slot disposed in the housing.

4. The engine crankcase breather of claim 1, wherein the baffle includes a plurality of baffles.

5. The engine crankcase breather of claim 4, wherein each of the plurality of baffles is disposed substantially parallel to one another in the housing.

6. The engine crankcase breather of claim 1, wherein the housing includes:
   a first cover, and
   a second cover coupled with the first cover.

7. The engine crankcase breather of claim 6, wherein at least one of the first cover and the second cover is integrally formed with the baffle.

8. The engine crankcase breather of the claim 1, wherein the third leg is connected to the second leg at an intersection of the first leg and the second leg, and wherein the third leg extends substantially parallel to the second leg.

9. The engine crankcase breather of claim 1, wherein the second leg and the third leg are disposed angularly with respect to the first leg.

10. The engine crankcase breather of claim 1, wherein the second leg, the third leg and the curl form the hook-shaped portion of the baffle.

11. The engine crankcase breather of claim 1, wherein the curl has a constant radius of curvature.

12. The engine crankcase breather of claim 1, wherein the curl extends through an angle of about 180 degrees.

13. The engine crankcase breather of claim 1, wherein the inlet includes a broadening inlet channel which connects to the housing.

14. An engine comprising:
   an engine cylinder having a cylinder head;
   a crankcase integral with the engine cylinder; and
   an engine crankcase breather including:
      a housing,
      an inlet in the housing, wherein the inlet is adapted to receive blow-by gases from the crankcase,
      an outlet in the housing, wherein the outlet is adapted to vent out the blow-by gases from the housing,
      a baffle within the housing between the inlet and the outlet, wherein the baffle includes a hook-shaped portion, and
      a trough disposed within the housing, wherein the trough is aligned with the hook-shaped portion of the baffle,
      wherein the baffle includes:
      a first leg having a planar structure;
      a second leg having a planar structure;
      a third leg having a planar structure, wherein the third leg is connected to the second leg at an intersection of the first leg and the second leg, and wherein the third leg extends substantially parallel to the second leg; and
      a curl extending from an edge of the second leg towards the first leg, wherein the curl, the second leg and the third leg forms the hook-shaped portion of the baffle.

15. The engine of claim 14, wherein the engine crankcase breather further includes a drain protruding from the housing, and wherein the drain is in fluid communication with the trough.

16. The engine of claim 14, wherein the trough includes a slot disposed in the housing.

17. The engine of claim 14, wherein the housing includes a first cover and a second cover, and at least one of the first cover and the second cover is integrally formed with the baffle.

\* \* \* \* \*